US006824167B2

(12) United States Patent
Nishimoto et al.

(10) Patent No.: US 6,824,167 B2
(45) Date of Patent: Nov. 30, 2004

(54) SEAT BELT SYSTEM FOR VEHICLES

(75) Inventors: Yousuke Nishimoto, Aku-Gun (JP); Takayuki Seto, Aku-Gun (JP); Kenji Muramatsu, Aku-Gun (JP); Hiroaki Nakao, Aku-Gun (JP)

(73) Assignee: Mazda Motor Corporation, Hiroshima (JP)

( * ) Notice: Subject to any disclaimer, the term of this patent is extended or adjusted under 35 U.S.C. 154(b) by 41 days.

(21) Appl. No.: 10/364,679

(22) Filed: Feb. 12, 2003

(65) Prior Publication Data

US 2003/0178835 A1 Sep. 25, 2003

(30) Foreign Application Priority Data

Feb. 18, 2002 (JP) ........................................ 2002-040015

(51) Int. Cl.⁷ ............................................. B60R 22/18
(52) U.S. Cl. ................................... 280/801.2; 297/473
(58) Field of Search .......................... 280/801.1, 801.2, 280/804, 808; 297/473, 481, 483

(56) References Cited

U.S. PATENT DOCUMENTS

| | | | | |
|---|---|---|---|---|
| 4,274,657 A | * | 6/1981 | Johnson et al. | 280/803 |
| 4,451,060 A | * | 5/1984 | Sylven | 280/801.1 |
| 4,475,746 A | * | 10/1984 | Akiyama | 280/808 |
| 4,817,754 A | * | 4/1989 | Muramoto | 180/268 |
| 4,915,414 A | * | 4/1990 | Weman | 280/801.1 |
| 5,149,135 A | | 9/1992 | Konishi et al. | |
| 6,323,444 B1 | | 11/2001 | Aoki | |
| 6,698,795 B2 | * | 3/2004 | Enomoto et al. | 280/808 |

FOREIGN PATENT DOCUMENTS

| | | |
|---|---|---|
| EP | 0 716 963 A1 | 6/1996 |
| EP | 1 068 970 A1 | 1/2001 |
| EP | 1 247 703 A1 | 10/2002 |
| JP | 8-142680 | 4/1996 |
| JP | 2002-283955 | 10/2002 |

OTHER PUBLICATIONS

Patent Abstracts of Japan vol. 2000, No. 22, Mar. 9, 2001 & JP 2001 138864 A (Toyota Autom Loom Works LTD) May 22, 2001  Abstract; Figures 1–3 .
European Search Report (Dated Jun. 3, 2003).

* cited by examiner

Primary Examiner—David R. Dunn
(74) Attorney, Agent, or Firm—Nixon Peabody, LLP; Donald R. Studebaker

(57) ABSTRACT

A seat belt system which does not interfere with the ingress and egress of rear seat passengers, and can detect the presence of an occupant without being influenced by the seat belt tension to provide the accurate weight detection. In one embodiment, the seat belt system comprises a retractor disposed in the rear door, an anchor of the seat belt webbing, and a rail member that allows the anchor of the seat belt webbing to slide in the vehicular longitudinal direction. The front end of the rail member is attached substantially on the seat side above a weight detecting device. The weight detecting device is disposed between the front seat and the floor panel, while the buckle capable of engaging the tongue of the seat belt webbing is disposed on the seat above the weight detecting device.

7 Claims, 10 Drawing Sheets

US 6,824,167 B2

SEAT BELT SYSTEM FOR VEHICLES

TECHNICAL FIELD OF THE INVENTION

The present invention relates to a seat belt system, more particularly, to a seat belt system for a vehicle which has a double door structure, in which a front door is supported to a vehicular body at its leading edge via a hinge and a rear door is supported to the vehicular body at its trailing edge via a hinge so that both the doors are opened and closed, for example.

BACKGROUND OF THE INVENTION

A double door structure is well known as disclosed in Japanese Unexamined Patent Publication No. H8-142680. The conventional structure includes a lock pillar extending vertically in the middle portion of a rear opening which is opened and closed by a left-side door and a right-side door in a double door configuration.

Such a double door structure may be provided for an ingress and egress opening on the side of a vehicle. In such a double door structure as described above, a center-pillar extends vertically in the middle portion of the ingress and egress opening, which is beneficial to the rigidity of the vehicle body, but is disadvantageous to the openness of the opening. To enhance the openness, a center-pillar-less structure, i.e. a structure without the center-pillar, is preferable.

As noted, a double door structure combined with the center-pillar-less body is preferred, however, in the case where a seat belt system is so configured that its seat belt webbing is extended from the rear door to the passenger compartment and a seat belt retractor for restricting the passenger is provided in the rear door, an extended length of the seat belt webbing spans between the frontal portion of the rear door and the lower portion of the door opening of the body. This impedes ingress and egress for rear passengers. It should be noted that as used herein, "passenger" refers to occupants of the vehicle generally, including the driver of the vehicle.

In order to solve the problem described above, a rail member may be provided which allows an anchor of the seat belt, especially of a lap belt, to slide in the vehicular longitudinal direction. The rail member is disposed between a floor portion in the vicinity of the outboard side of a front seat and a rear portion thereof. With this configuration, the opening motion of the rear door causes the anchor to slide rearwardly along the rail member, which prevents the seat belt from interfering with the ingress or egress of rear passengers.

In the meantime, it is required to detect weight acting on the front seat for the purpose of deciding whether air bags should be deployed. However, when the rail member is attached to the floor, and when a weight detecting device for detecting weight is provided between the front seat and the floor, the fastening of the seat belt by an occupant in the front seat causes tension in the seat belt to act on the anchor and the lap belt. Thus, the front seat is subjected to tension towards the floor in addition to the weight of the occupant, which may possibly result in the erroneous detection by the weight detecting device.

SUMMARY OF THE INVENTION

In view of the above, an object of the present invention is to provide a seat belt system for vehicles, particularly, a seat belt system which does not interfere with the ingress and egress of the rear seat passenger, which can detect the presence of an occupant without being influenced by the seat belt tension to provide the accurate weight detection. In one embodiment, this may be attained by attaching the front end of the rail member which allows the seat belt anchor to slide in the vehicular longitudinal direction substantially on the seat side above a weight detecting device.

According to the present invention, the object is achieved by a seat belt system for a vehicle, comprising a retractor disposed in a rear door for retracting a seat belt webbing for restraining an occupant in a front seat, an anchor of the seat belt webbing disposed laterally adjacent to the front seat, a rail member attached to the vehicle at a front attached portion and a rear attached portion for allowing the anchor of the seat belt webbing to slide in the vehicular longitudinal direction, a weight detecting device disposed between the front seat and a floor panel for detecting weight acting on the front seat, and a buckle capable of engaging a tongue of the seat belt webbing, disposed on the seat above the weight detecting device, wherein the front attached portion of the rail member is attached substantially on the seat above the weight detecting device.

Accordingly, when the seat belt webbing is retractably reeled out from the retractor in the rear door and the tongue of the seat belt webbing engages the buckle, the three-point seat belt restraint configuration for restraining the occupant in the front seat is attained. On the other hand, when the rear door is opened after the seat belt webbing is released, the opening motion of the rear door causes the anchor of the seat belt webbing to move rearwardly along the rail member. This prevents the seat belt webbing from interfering with the ingress and egress of the rear passengers.

Furthermore, when the seat belt webbing is fastened, the presence of passenger can be detected without being influenced by the seat belt tension because the front end of the rail member is attached substantially on the seat above the weight detecting device. This ensures accurate weight detection by the weight detecting device.

Preferably, in one embodiment of the apparatus according to the present invention, the weight detecting device may include a load detecting portion which detects load of the passenger, a base member which supports the load detecting portion, and a load transfer member which transfers load acting on the front seat to the load detecting portion, the front attached portion of the rail member being fixed to the load transfer member. Therefore, there is no need for additional parts to fix the rail member because the rail member is fixed efficiently utilizing the load transfer member of the weight detecting device, thereby reducing the number of parts.

More preferably, the rear portion of the weight detecting device may be located in the vicinity of the rear end portion of a seat cushion of the front seat, the front attached portion of the rail member may be fixed to an extension extending rearwardly from the rear end of the load transfer member, and the rail member may include a curved portion between the front attached portion and a slide portion on which the anchor slides. The curved portion may firstly extend forwardly and downwardly from the front attached portion and then curve upwardly and rearwardly, and further deviate outboardly in the vehicular lateral direction from the front attached portion towards the front end of the slide portion. That is, the anchor point is surely provided avoiding the interference with other parts such as a reclining mechanism provided in the front seat because the rail member is constructed so as to have the curved portion which outboardly deviates towards the front end of the slide portion.

Furthermore, the anchor of the seat belt webbing may preferably have a predetermined longitudinal length along the sliding direction and may be slidably fitted onto the slide portion of the rail member, and the curvature of the curved portion curving upwardly in the rail member may be set with a small curvature as to prevent the anchor from sliding onto the curved portion. Accordingly, the curvature of the curved portion set as above prevents the anchor from sliding onto the curvature which upwardly curves, thereby avoiding the rearward movement of the anchor point through the curved portion after the seat belt webbing is fastened.

Still further, the longitudinal length of the anchor may preferably be set to a predetermined length which prevents the anchor from sliding onto the upwardly curved portion. Accordingly, the anchor is prevented from sliding onto the curved portion by the predetermined longitudinal length of the anchor itself.

Preferably, the vehicle may comprise a door opening, a front door swingably supported at the front edge of the door opening, and the rear door swingably supported at the rear edge of the door opening, wherein the front door and the rear door can cooperatively close the door opening.

These and other objects, features, aspects, and advantages of the present invention will become more apparent from the following detailed description of the preferred embodiment relative to the accompanied drawings.

DETAILED DESCRIPTION OF THE INVENTION

A preferred embodiment of the present invention will now be described with reference to the drawings. The drawings show a seat belt system for a vehicle. Firstly, with reference to FIG. 1 to FIG. 4, a body structure and a door structure will be described.

Figure 1:
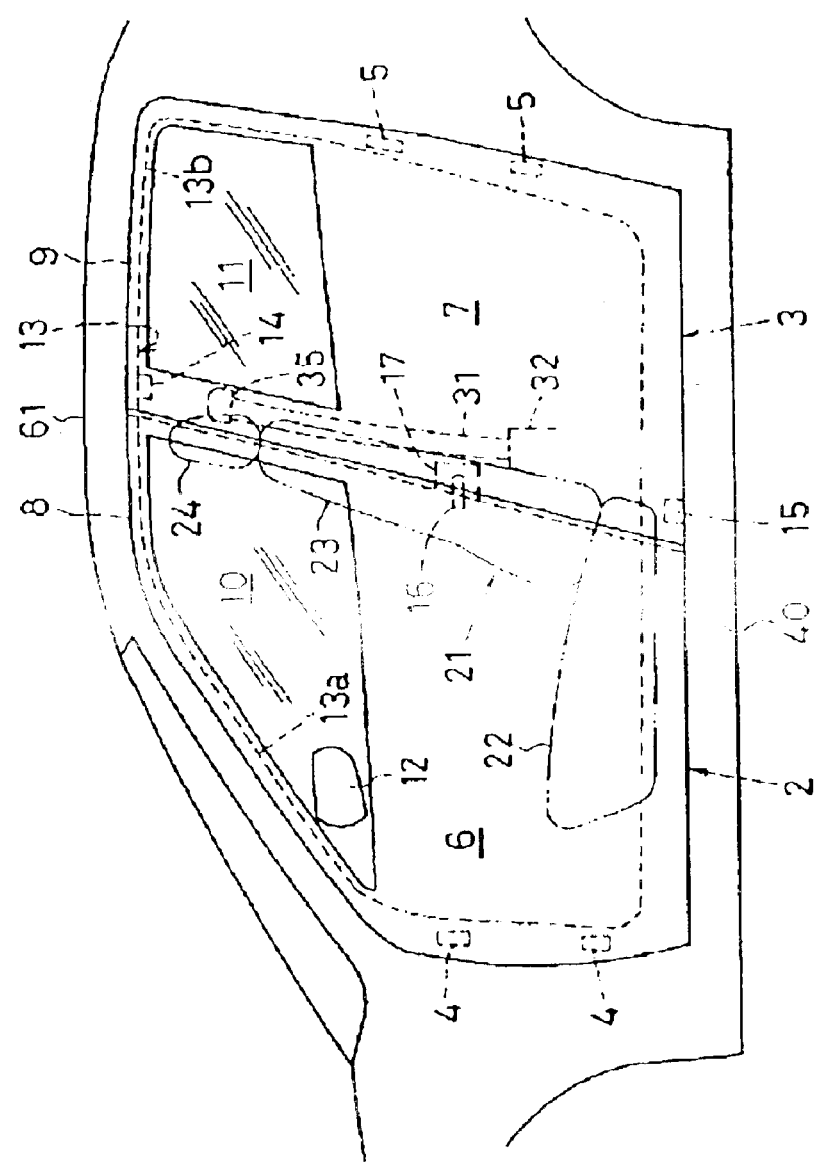
FIG. 1 is a side view of a vehicle equipped with the seat belt system in accordance with the present invention.
Figure 3:
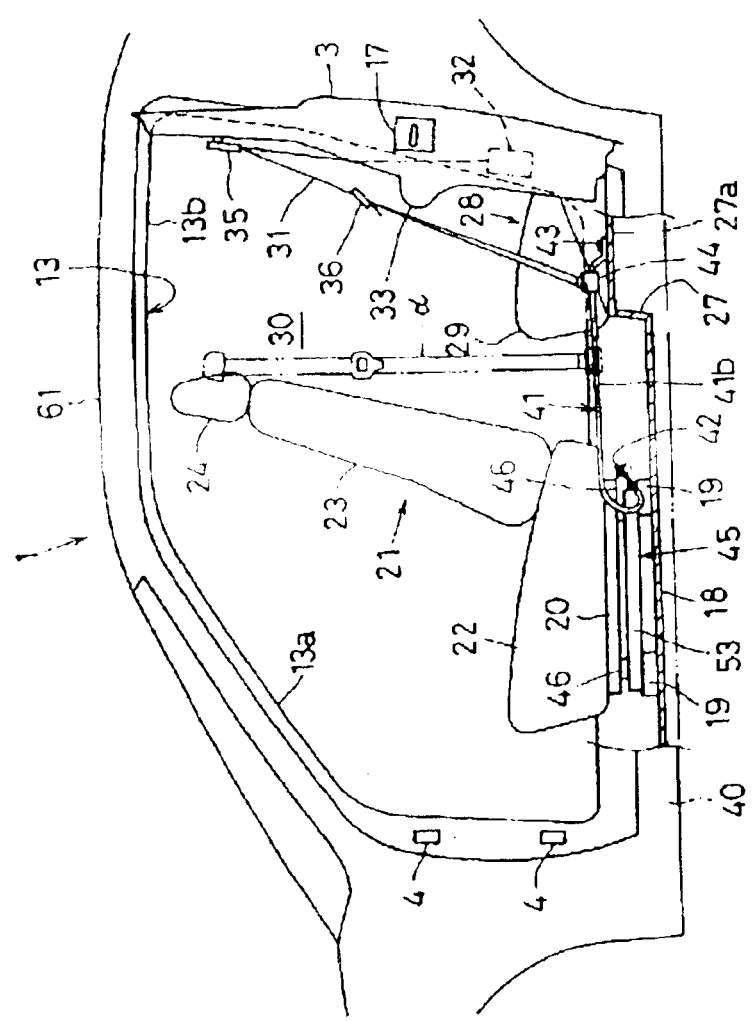
FIG. 3 is a side view illustrating the seat belt movement when the doors are being opened.

As shown in FIG. 1 and FIG. 3, side doors are disposed on the side portions of a body of a vehicle 1. The side doors consist of a front door 2 and a rear door 3 which are supported on the side portion of a body of the vehicle 1 via front-door hinges 4 and rear-door hinges 5 attached on the a leading edge of the front door 2 and a trailing edge of the rear door 3, respectively. The front door 2 and the rear door 3 constitute a side door structure in a free style configuration, or so-called a double door configuration.

The front door 2 and the rear door 3 comprise door panels 6, 7, door sashes 8, 9, and door windows 10, 11, respectively. Between the door panel 6 and door panel 7 (specifically, in the interspace defined by a door inner-panel and a door-outer panel), side impact bars (not shown) extend in the vehicular longitudinal direction, respectively. On the front door 2, a side mirror for rearward visibility and optionally, an outside door-handle (not shown) for unlatch operation of the front door 2 from the outside are disposed. In the double door configuration according to this embodiment, the rear door 3 is prohibited from opening unless the front door 2 is initially opened.

Inboardly adjacent to the side doors in the closed position illustrated in FIG. 1, a front ingress and egress opening 13a for a front passenger and a rear ingress and egress opening 13b for a rear passenger as door openings (side openings of the vehicle) are continuously formed to provide a continuous opening 13, whereby a center-pillar-less body structure is obtained. The openings 13a and 13b are closed and opened by the doors 2, 3 respectively.

As shown in FIG. 1, at the forward portions of the upper and lower edge of the rear door 3, the locks 14, 15 are provided for locking the rear door 3 between the body side and a striker. Proximate to the middle portion of the leading edge of the rear door 3, a lock 17 is provided on the front door 2 for locking a striker 16.

Figure 2:
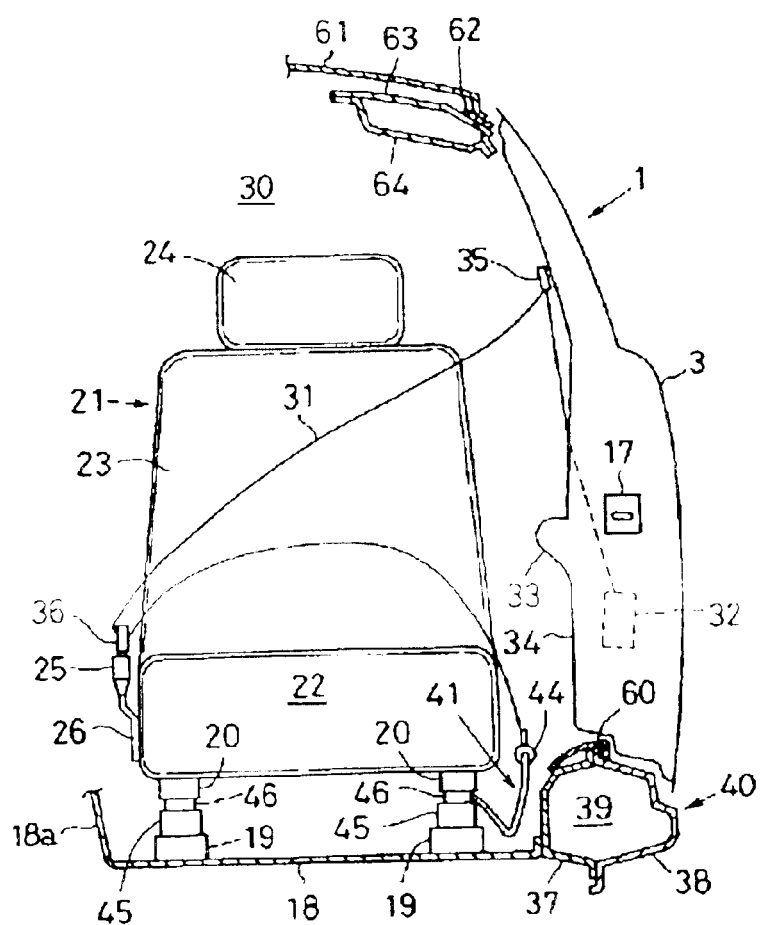
FIG. 2 is an elevational view of the main components of the present invention when the doors are closed.

Additionally, as shown in FIG. 2 and FIG. 3, a front seat 21 is mounted on a floor panel 18 via brackets 19 and a seat-sliding system 20. The front seat 21 comprises a seat cushion 22, a seat back 23, and a headrest 24. A buckle 25 is provided on the seat cushion 22 of the front seat 21 so as to be adjacent to a tunnel 18a. The buckle 25 is secured to the seat cushion bracket of the seat cushion 22 via a stalk 26. The rear portion of the floor panel 18 is stepped upwardly to unitarily or integrally form a kick-up 27. On the top deck surface (i.e. the top surface) of the kick-up 27, a seat cushion 29 of a rear seat 28 is mounted. Thus, as shown in FIG. 3, in a passenger compartment 30 of the vehicle 1, plural rows of seats 21, 28 are arranged in the vehicular longitudinal direction.

Figure 4:
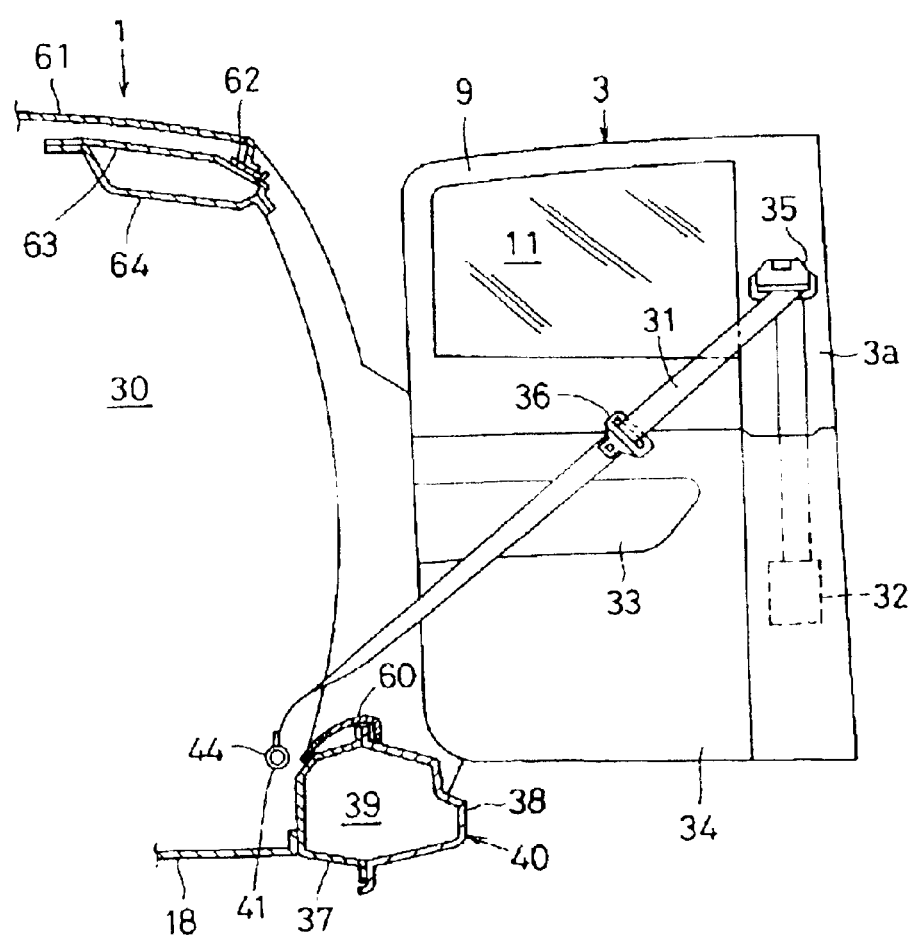
FIG. 4 is an elevational view of the main components of the present invention when the doors are open.

FIG. 2 is a partial elevational view showing the front seat 21 and the rear door 3 in the closed state, and FIG. 4 is a partial elevational view showing the rear door 3 in the open state. The drawings depict a seat belt webbing 31 for restraining the occupant in the front seat 21. This seat belt webbing 31 is retracted by a retractor 32 disposed on a front structural door-member 3a of the rear door 3. The front structural door-member 3a has the equivalent rigidity to that of a center-pillar which would be otherwise provided. The lower half of the inboard side of the rear door 3 is covered with a door trim 34 having an armrest 33. Additionally, at the upper portion of the inboard side of the front structural door-member 3a, a shoulder anchor 35 is attached so as to face the flank of headrest 24 of the front seat 21.

The seat belt webbing 31 is so arranged as to extend from the retractor 32 through the upper edge of the door trim 34 along the inboard side of the front structural door-member 3a, and to reach the passenger compartment 30 through the shoulder anchor 35. The shoulder anchor 35 supports a portion of the extended length of the seat belt webbing 31. On an extended length of the seat belt webbing 31, a tongue 36 is slidably provided. The distal end, or the lower end of the seat belt webbing 31 is connected to the lower edge of the door opening 13 so as to be slidable back and forth, as shown in FIG. 3. The sliding structure of the lower end of the seat belt webbing 31 will be described in detail hereinafter.

Figure 5:
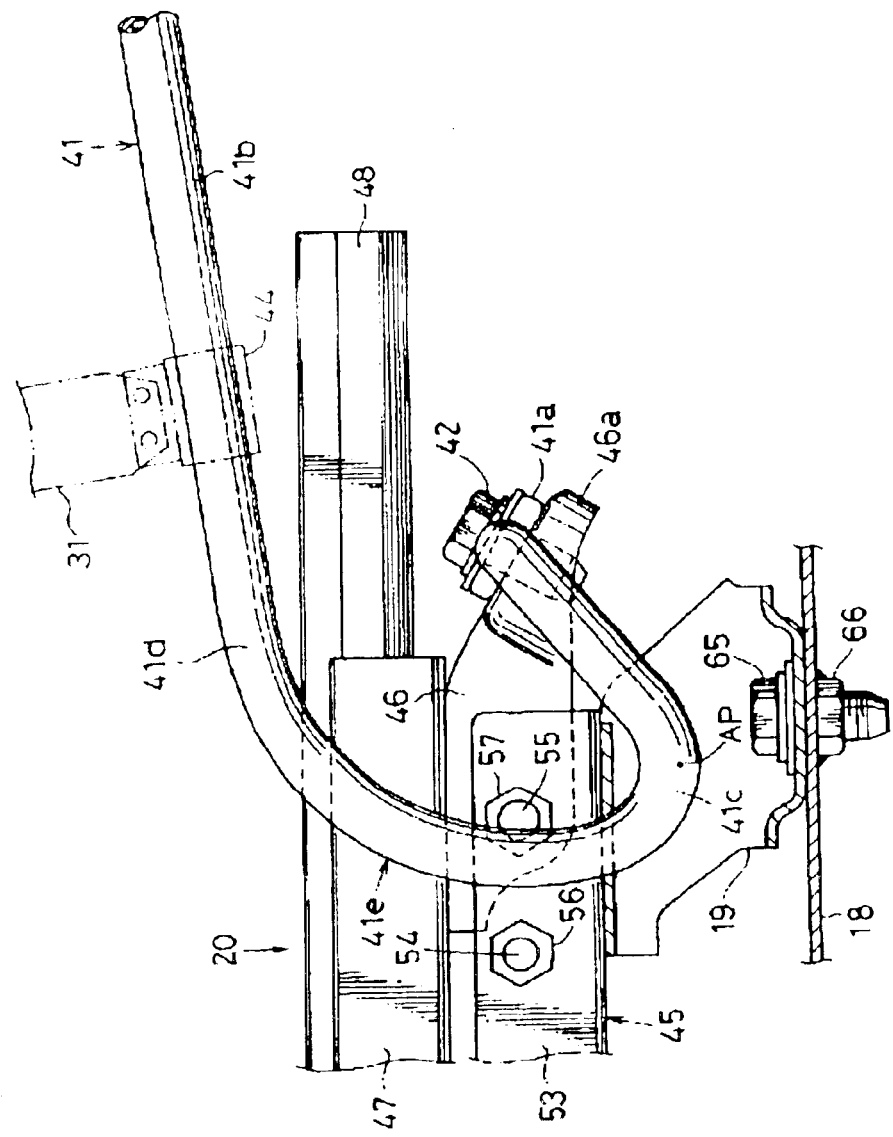
FIG. 5 is an enlarged view showing the front attaching structure of the rail member.
Figure 6:
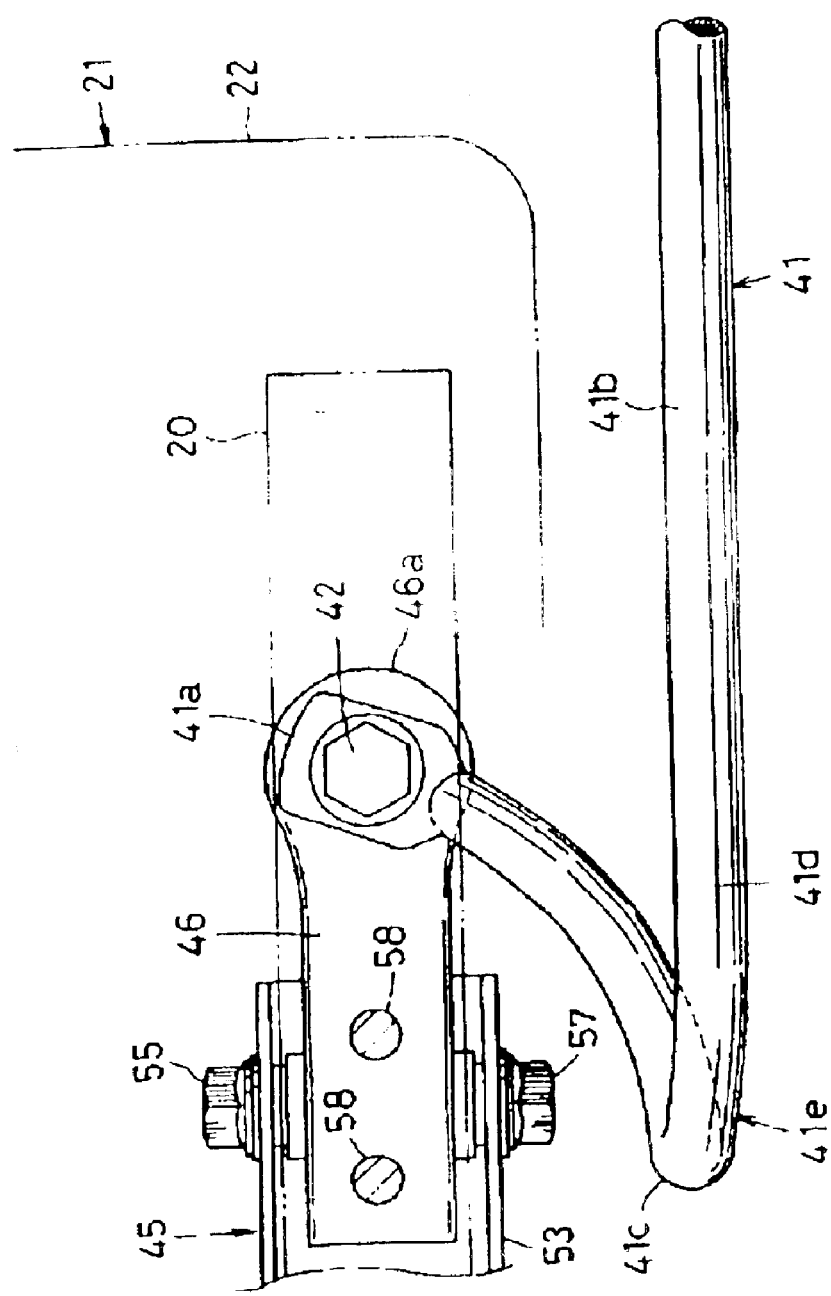
FIG. 6 is a top plan view showing the front attaching structure of the rail member.
Figure 7:
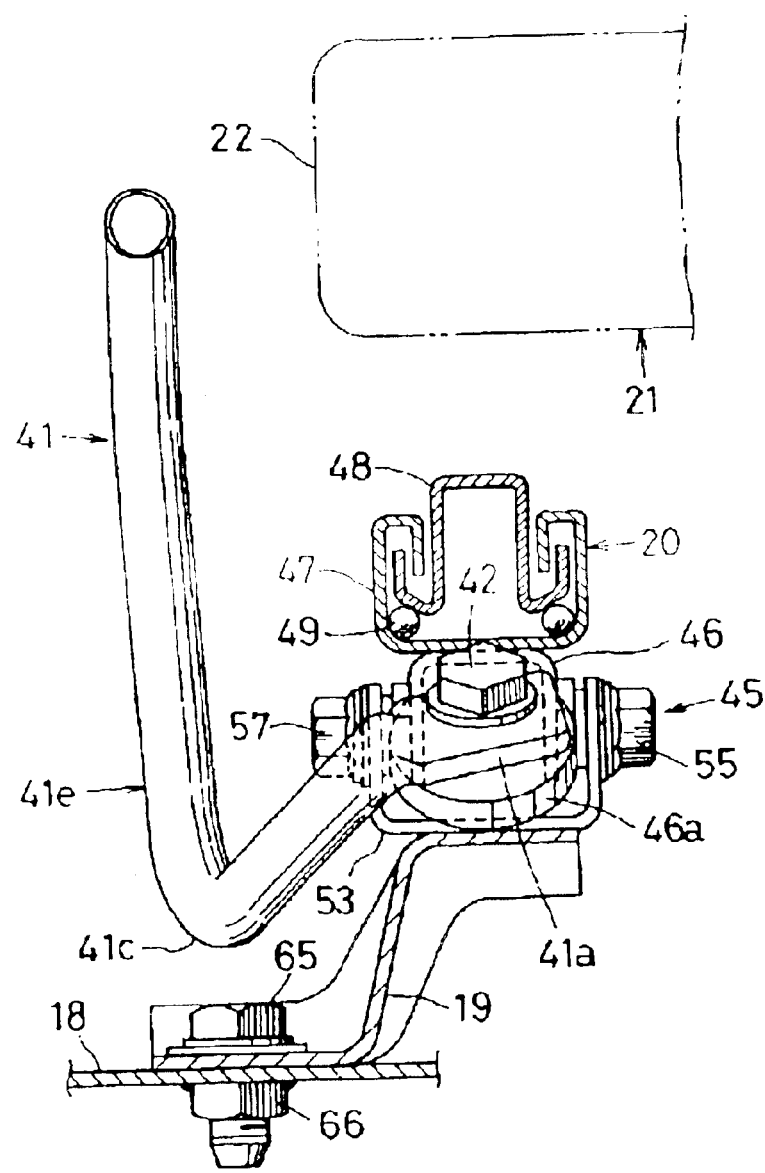
FIG. 7 is a rear view showing the front attaching structure of the rail member.
Figure 8:
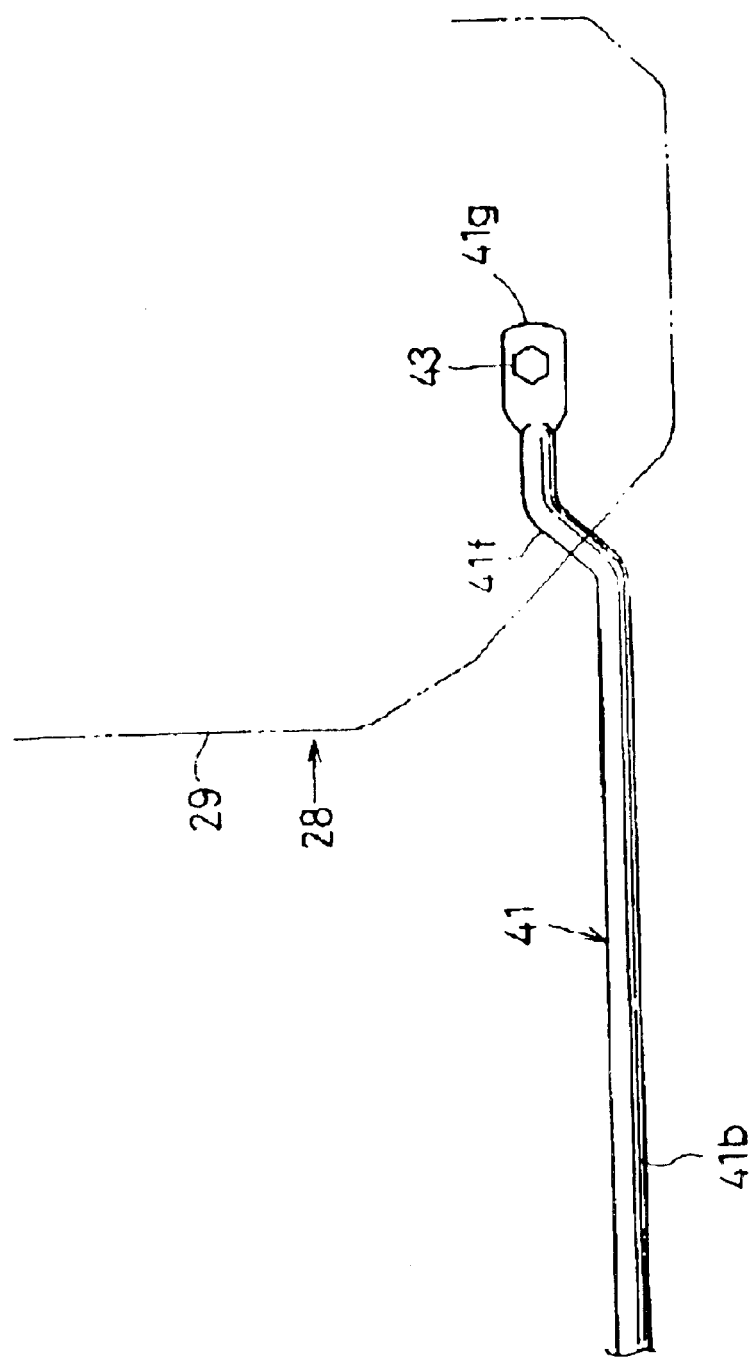
FIG. 8 is a top plan view showing the rear attaching structure of the rail member.

As shown in FIG. 2 and FIG. 3, along both lateral sides of the floor panel 18 (only one of which is show in the drawings), a side sill 40 is disposed, the side sill 40 being a structural member that includes a closed cross-section 39 defined by a side-sill inner 37 and a side-sill outer 38 as most clearly shown in FIG. 2. A rail member 41, which is formed from a metallic cylindrical rod, is fixedly secured via bolts 42, 43, nearly along the height of the upper edge of the side-sill 40. FIG. 5, FIG. 6, and FIG. 7 show the overall construction and attaching structure of the frontal portion of the rail member 41. FIG. 8 shows the overall construction and attaching structure of the rear portion of the rail member 41.

As shown in FIG. 5, FIG. 6 and FIG. 7, the rail member 41 includes a front attached portion 41a in a planar shape that maybe formed by pressing the metallic rod, and a slide portion 41b which guides the anchor 44 of the seat belt webbing 31, which may be implemented as a slider, in the vehicular longitudinal direction. In addition, as shown in FIG. 5, the rail member 41 includes a curved portion 41e between the front attached portion 41a and the slide portion 41b. As shown, the curved portion 41e forwardly and downwardly extends from the front attached portion 41a to a front-lower end 41c, and curves rearwardly and upwardly from the front-lower end 41c to the slide portion 41b. Moreover, as shown in FIG. 6, the curved portion 41e is formed so as to deviate outboardly, i.e. towards the side-sill 40 in the vehicular lateral direction from the front attached portion 41a towards the front end 41d of the slide portion 41b.

In accordance with one embodiment, the anchor 44 of the seat belt webbing 31 of the lap belt as shown in FIG. 2 has a predetermined longitudinal length along the sliding direction (along the back and forth direction) and is slidably fitted onto the slide portion 41b of the rail member 41. The curved portion upwardly curving from the front-lower end 41c of the rail member 41 has such a small curvature that it prevents the anchor 44 from sliding onto the curved portion from above. Additionally, the predetermined longitudinal length of the anchor 44 may be set so as to prevent it from sliding onto the curved portion upwardly curving from the front-lower end 41c. The front attached portion 41a of the rail member 41 is fixedly secured to an extension 46a extending rearwardly from a load transfer device 46 as a part of a weight detecting device 45 via bolt 42 as described above.

On the other hand, as shown in FIG. 3 and FIG. 8, the rear portion of the rail member 41 includes a bending portion 41f bending downwardly and inboardly in the vehicular lateral direction from the slide portion 41b, and a rear attached portion 41g in a planar shape formed unitarily with the bending portion 41f. The rear attached portion 41g is fixed to the top deck surface 27a rearward of the kick-up 27 via the bolt 43 as described above. The fixed portion is concealed by the seat cushion 29 of the rear seat 28 when viewed from above. The weight detecting device 45 is disposed between the seat sliding system 20 for the front seat 21 and a seat bracket 19 on the floor panel 18, as shown in FIG. 2 and FIG. 3. The weight detecting device is provided for detecting the weight acting on the front seat 21.

A pair of seat sliding systems 20 is disposed below the driver's seat. Likewise, a pair of seat sliding systems 20 is disposed below the front-passenger's seat. As shown in FIG. 7, the seat sliding system 20 described above comprises a lower rail 47, an upper rail 48, and a plurality of balls 49 disposed between the upper rail 48 and the lower rail 47.

Figure 9:
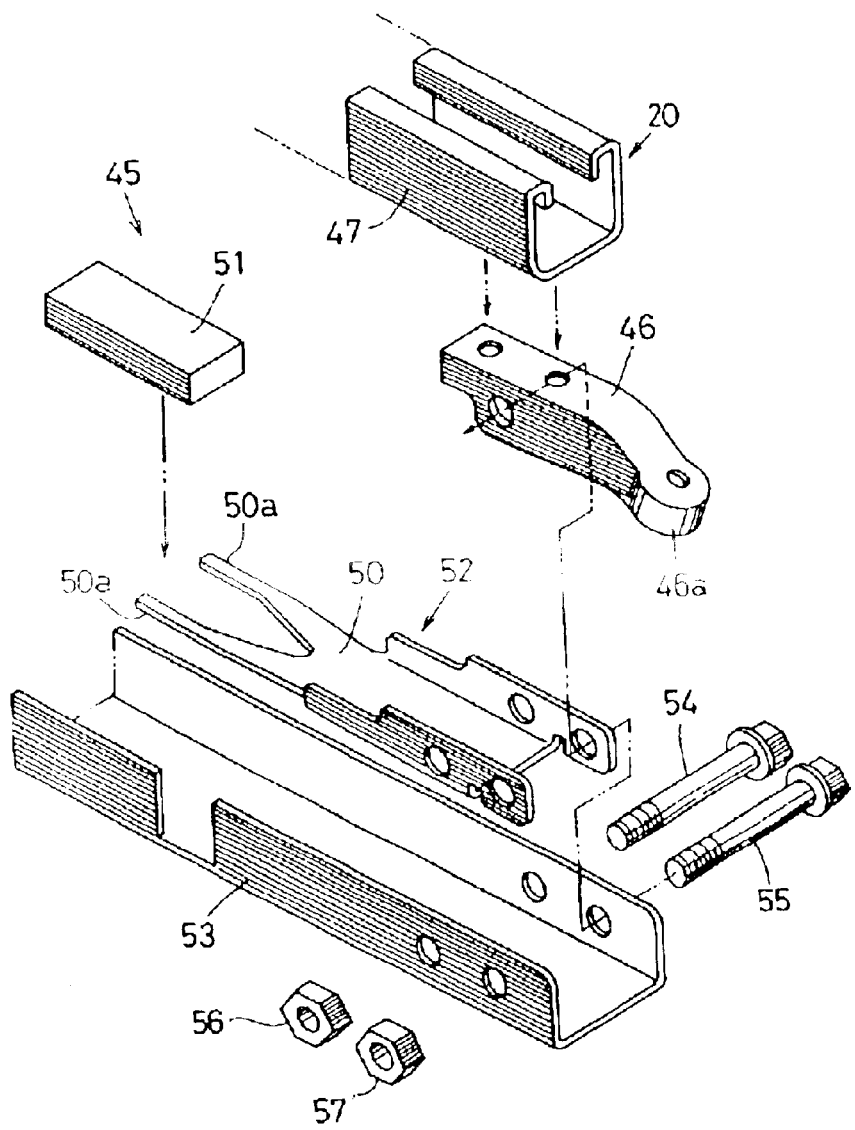
FIG. 9 is an exploded perspective view showing the main components of the weight detecting device.

Corresponding to the four seat sliding systems 20, four sets of the weight detecting device 45 are provided in total. FIG. 9 is an exploded perspective view showing the main parts of the weight detecting device 45. As shown, the weight detecting device 45 comprises a load detecting portion 52 having a U-shape cross-section and including a pair of arms 50, a load sensor 51 for detecting the weight of the occupant, a base member 53 having a U-shape cross-section and supporting the load detecting portion 52, and the load transfer member 46 which transfers the load acting on the front seat 21 to the load detecting portion 52. The base member 53 extends in the vehicular longitudinal direction, with approximately the same longitudinal length as the lower rail 47 in the seat sliding system 20. The base member 53 is fixedly secured to the floor panel 18 via seat brackets 19, as shown in FIG. 3.

Two sets of the load detecting portion 52 and the load transfer member 46 are provided at the front portion and rear portion of the base member 53, respectively. In other words, a set of the load detecting portion 52 and the load transfer member 46 is provided at the front portion, and the other set is provided at the rear portion. FIG. 9 is an exploded perspective view showing the rear portion of the weight detecting device 45.

The arm 50 is separated into two load acting portions 50a on which the load from the load transfer member 46 acts. The arm 50 and the load transfer member 46 are fixed to the inner portion of the base member 53 via bolts 54, 55 and nuts 56, 57. Moreover, the load transfer member 46 is fixedly secured to the lower rail 47 of the seat slide system 20 via bolts 58 shown in FIG. 6. As shown in FIG. 6, the rear portion of the weight detecting device 45 is located in the vicinity to the rear edge of the front seat 21.

The load acting on the load transfer member 46 slightly deflects the arm 50 within the range up to 5 degrees, so that load acting portions 50a of the arm 50 transfer the load to the load sensor 51. The load sensor 51 picks up the mechanical strain of the load acting portion 50a in the form of an electrical signal to detect the weight of the occupant. The detailed structure of the weight detecting device 45 may be implemented similarly to that disclosed in U.S. Pat. No. 6,323,444 issued on Nov. 27, 2001, the contents of which is incorporated herein by reference in its entirety.

The load transfer member 46 is unitarily formed with the extension 46a extending rearwardly at the rear portion of the load transfer member 46. The extension 46a is in an approximately cylindrical shape and slanted down to the rearward such that its rear end is located lower than its front end. The extension 46a is fitted to the front attached portion 41a of the rail member 41 described above via bolt 42 as shown in FIG. 5, FIG. 6, and FIG. 7. With this structure, the front attached portion 41a of the rail member 41 is disposed substantially on the seat 21 above the weight detecting device 45.

In the drawings, various other components of the vehicle to which the present invention may be applied are shown. For example, various figures show a scuff plate 60 made of plastic resin, a roof panel 61, a roof rail 62, a roof side rail outer 63, the roof side rail inner 64, and a bolt 65 and a nut 66 for fixing the seat bracket 19 to the floor panel 18, respectively. It should be noted that the drawings show only the structure on the left side of the vehicle, and the structures on the right and left sides are symmetrically constructed.

Next, the action of the seat belt system for a vehicle constructed as discussed above will now be described. As shown by broken lines in FIG. 1 and by phantom lines α in FIG. 3, when the rear door 3 is in the closed state, the seat belt webbing 31, the shoulder anchor 35 and the tongue 36 are so arranged as to face the flank of the seat back 23 and head rest 24 of the front seat 21. When the front passenger pulls the seat belt webbing 31 to fasten the seat belt, the lower end portion of the seat belt webbing that is attached to the movable anchor 44 is caused to move to a forward position in the vicinity of the front seat 21 along the slide portion 41b of the rail member 41. Therefore, as shown in FIG. 2, the engagement of the clasp at the tip of the tongue 36 with the buckle 25 results in the three-point seat belt restraint configuration for restraining the occupant in the front seat 21.

When the occupant in the front seat is restricted by the seat belt webbing 31, the presence of the occupant can be accurately detected by the weight detecting device 45 without being affected by tension in the seat belt webbing 31. This is attained because the front end of the rail member 41 is fixed substantially on the seat 21 above the weight detecting device 45. As previously noted, if the front end of the rail member 41 is fixed under portion of the weight detecting device 45 (for example, to the floor panel 18), tension in the seat belt webbing 31 would act as additional load on the load detecting device 45 so that the presence of the occupant cannot be accurately detected.

On the other hand, when the rear door 3 is opened after the front passenger unlatches the seat belt 31 and opens the front door 2, the opening motion of the rear door 3 pulls the seat belt webbing 31 rearwardly. Accordingly, as showing in FIG. 3, the lower portion of the seat belt webbing attached to the anchor 44 moves to a rearward position along the slide portion 41b of the rail member 41, causing no interference with the legs of the rear passenger during egress from the vehicle. Same would apply with respect to passenger ingress to the vehicle. Therefore, during both the ingress and egress of the rear passenger, the seat belt webbing 31 causes no interference with the passenger.

As described above, in accordance with the embodiment of the present invention shown in FIG. 1 to FIG. 9, there is provided a seat belt system for a vehicle, comprising the retractor 32 disposed in the rear door 3 for retracting the seat belt webbing 31 for restraining the occupant in the front seat, and the anchor 44 of the seat belt webbing 31 disposed laterally adjacent to the front seat 21, where the rail member 41 is provided for allowing the anchor 44 of the seat belt webbing 31 to slide in the vehicular longitudinal direction. The weight detecting device 45 is disposed between the front seat 21 and the floor panel 18 for detecting weight acting on the front seat 21, the buckle 25 capable of engaging the tongue 36 of the seat belt webbing 31 is disposed on the seat 21 above the weight detecting device 45, and the front end of the rail member 41 is attached substantially on the seat 21 above the weight detecting device 45.

According to this construction, when the seat belt webbing 31 is retractably reeled out from the retractor 32 in the rear door 3 and the tongue 36 of the seat belt webbing 31 engages the buckle 25, the three-point seat belt restraint configuration for restraining the occupant in the front seat is attained as shown in FIG. 2. On the other hand, when the rear door 3 is opened after the seat belt webbing 31 is released, the opening motion of the rear door 3 causes the anchor 44 of the seat belt webbing 31 to rearwardly move along the rail member 41. This prevents the seat belt webbing 31 from interfering with the ingress and egress of the rear passengers.

Furthermore, when the seat belt webbing 31 is fastened, the presence of passenger can be detected without being influenced by the seat belt tension, because the front end of the rail member 41 is attached substantially on the seat 21 above the weight detecting device 45. This ensures accurate weight detection by the weight detecting device 45. The weight detecting device 45 includes the load detecting portion 52 which detects load of the passenger, and the base member 53 which supports the load detecting portion 52, the load transfer member 46 transferring the load acting on the front seat 21 to the load detecting portion 52, where the front attached portion 41a of the rail member 41 is fixed on the load transfer member 46. According to this construction, there is no need for additional parts for fixing the rail member because the rail member 41 is fixed efficiently utilizing the load transfer member 46 of the weight detecting device 45 which reduces the number of parts.

Moreover, as described with reference to FIG. 5 and FIG. 6, the rear portion of the weight detecting device 45 is located in the vicinity of the rear end portion of the seat cushion 22 of the front seat 21. The front attached portion 41a of the rail member 41 is fixed to the extension 46a extending rearwardly from the rear end of the load transfer member 46. The rail member 41 includes the curved portion 41e between the front attached portion 41a and the slide portion 41b on which the anchor 44 slides, the curved portion 41e firstly extending forwardly and downwardly from the front attached portion 41a and then curving upwardly and rearwardly, and further deviating outboardly in the vehicular lateral direction from the front attached portion 41a towards the front end 41d of the slide portion 41b. According to this construction, the anchor point is surely provided avoiding the interference with other parts such as a reclining mechanism provided in the front seat 21, because the rail member 41 is constructed so as to have the curved portion 41e which outboardly deviates towards the front end of the slide portion 41b.

Here, in this embodiment, the point "AP" shown in FIG. 5 actually serves as an anchor point. In this regard, the anchor 44 of the seat belt webbing 31 has a predetermined longitudinal length along the sliding direction and is slidably fitted onto the slide portion 41b of the rail member 41. The curvature of the curved portion curving upwardly in the rail member 41 (refer to the curvature of the front-lower end 41c) has a small curvature so as to prevent the anchor 44 from sliding onto the curved portion. According to this construction, the curvature of the curved portion set as above prevents the anchor 44 from sliding onto the curvature which upwardly curves, thereby avoiding the rearward movement of the anchor point after the seat belt webbing 31 is fastened. Furthermore, the longitudinal length of the anchor 44 is set to a predetermined length which prevents it from sliding onto the curved portion upwardly curving (refer to the front-lower end 41c). According to this construction, the anchor 44 is prevented from sliding onto the curved portion 41e by the predetermined longitudinal length of the anchor 44 itself.

Figure 10:
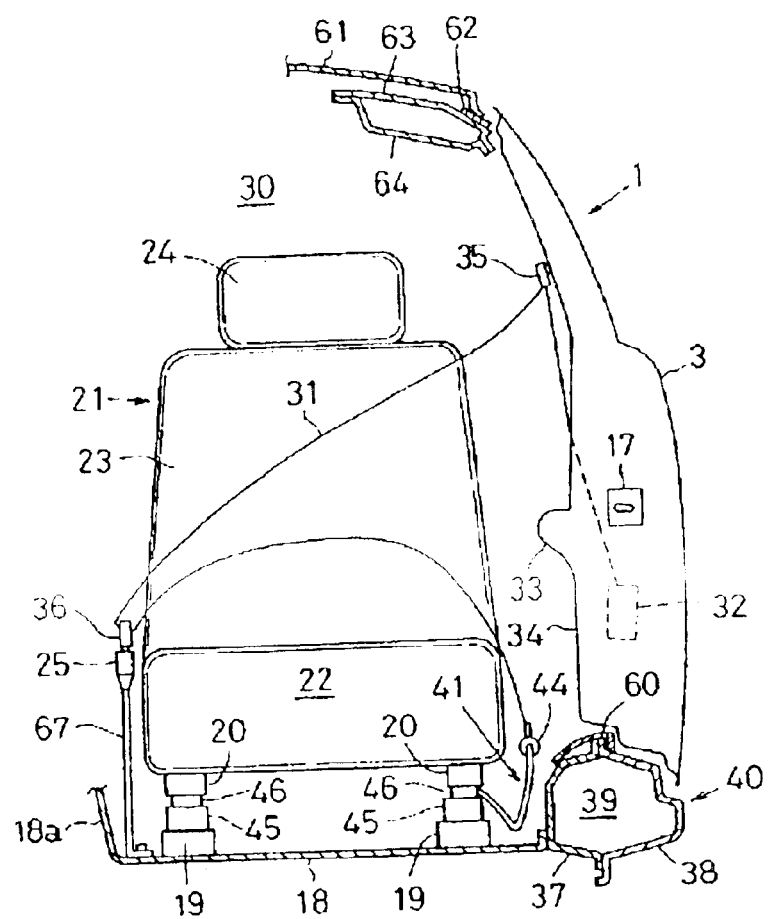
FIG. 10 is an elevational view showing the other embodiment of the seat belt system for vehicles.

FIG. 10 shows the other embodiment of the seat belt system for a vehicle. Whereas the buckle 25 is fixed to the seat cushion 22 via the stalk 26 in the embodiment shown in FIG. 2, the buckle 25 is fixed to the floor panel 18 via a buckle bracket 67 in this alternative embodiment shown in FIG. 10. The detailed description of this embodiment is omitted since the embodiment is similar in construction, function, and advantage to the embodiment of FIG. 2 discussed above. In this regard, FIG. 10 is illustrated using identical reference numerals for the identical elements to those shown in the embodiment of FIG. 2.

With respect to the correspondence between the elements of the present invention and the embodiments described above, the front seat in the present invention corresponds to the front seat 21 in the embodiment. Similarly, the floor corresponds to the floor panel 18, the buckle device corresponds to the buckle 25, and the tongue corresponds to the tongue member 36. However, the present invention is not limited to the construction in the embodiments described above. For example, the portion on which the rear portion of the rail member 41 is attached may be the corresponding portion thereto of the side-sill inner 37, instead of the top deck surface rearward of the kick-up 27.

Thus, in view of the above, it should be evident that according to the present invention, a seat belt system for vehicles is provided which does not interfere with the ingress and egress of the rear seat passenger, and can detect the presence of an occupant without being influenced by the seat belt tension to provide the accurate weight detection. This may be attained by attaching the front end of the rail member which allows the seat belt anchor to slide in the vehicular longitudinal direction on the seat side, above a weight detecting device.

While particular embodiments of the present invention have been illustrated and described in relation to particular embodiments thereof, it will be obvious to those skilled in the art that many other variations and modifications and other uses will become apparent. It is preferred, therefore, that the present invention be limited not by the specific disclosure herein, but only by the appended claims.

What is claimed is:

1. A seat belt system for a vehicle comprising:
    a retractor disposed in a rear door for retracting a seat belt webbing for restraining an occupant in a front seat;
    an anchor of the seat belt webbing disposed laterally adjacent to the front seat;
    a rail member attached to the vehicle at a front attached portion and a rear attached portion for allowing said anchor of the seat belt webbing to slide in a vehicular longitudinal direction;
    a weight detecting means disposed between the front seat and a floor panel for detecting weight acting on the front seat; and
    a buckle adapted to engage a tongue of the seat belt webbing, the buckle being disposed on the seat above said weight detecting means;
    wherein said front attached portion of said rail member is attached substantially on the seat above said weight detecting means.

2. A seat belt system for a vehicle of claim 1, wherein said weight detecting means comprises:
    a load detecting portion adapted to detect load of the occupant;
    a base member which supports said load detecting portion; and
    a load transfer member which transfers load acting on the front seat to said load detecting portion, said front attached portion of said rail member being fixed to said load transfer member.

3. A seat belt system for a vehicle of claim 2, wherein a rear portion of said weight detecting means is located proximate to a rear end portion of a seat cushion of the front seat, said front attached portion of said rail member is fixed to an extension extending rearwardly from a rear end of said load transfer member, and said rail member includes a curved portion between said front attached portion and a slide portion on which said anchor slides, said curved portion firstly extending forwardly and downwardly from said front attached portion and then curving upwardly and rearwardly, and further deviating outboardly in a vehicular lateral direction from said front attached portion towards a front end of said slide portion.

4. A seat belt system for a vehicle of claim 3, wherein said anchor of the seat belt webbing has a predetermined longitudinal length along the sliding direction and is slidably fitted onto said slide portion of said rail member, said curved portion curving upwardly in said rail member having a curvature dimensioned to prevent said anchor from sliding onto said curved portion.

5. A seat belt system for a vehicle of claim 3, wherein the longitudinal length of said anchor is set to a predetermined length which prevents said anchor from sliding onto said curved portion upwardly curving.

6. A seat belt system for a vehicle of claim 1, wherein the vehicle includes a door opening, and a front door swingably supported at the front edge of the door opening, the rear door being swingably supported at a rear edge of the door opening, the front door and the rear door being cooperatively operable to close the door opening.

7. A seat belt system for a vehicle, the vehicle including a door opening, a front door swingably supported at the front edge of the door opening, and a rear door swingably supported at the rear edge of the door opening, the front door and the rear door being cooperatively operable to close the door opening, the seat belt system comprising:
    a retractor disposed in the rear door for retracting a seat belt webbing for restraining an occupant in a front seat;
    an anchor of the seat belt webbing disposed laterally adjacent to the front seat;
    a rail member attached to the vehicle at a front attached portion and a rear attached portion for allowing said anchor of the seat belt webbing to slide in a vehicular longitudinal direction, said rail member including a curved portion between said front attached portion and a slide portion on which said anchor slides, said curved portion firstly extending forwardly and downwardly from said front attached portion and then curving upwardly and rearwardly, and deviating outboardly in the vehicular lateral direction from said front attached portion towards a front end of said slide portion;
    a weight detecting device adapted to detect weight acting on the front seat, said weight detecting device being disposed between the front seat and a floor panel with a rear portion of said weight detecting device being proximate to a rear end portion of a seat cushion of the front seat, said weight detecting device including a load detecting portion which detects load of the occupant, a base member which supports said load detecting portion, and a load transfer member which transfers load acting on the front seat to said load detecting portion, said front attached portion of said rail member being fixed to said load transfer member; and
    a buckle adapted to engage a tongue of the seat belt webbing, the buckle being disposed on the seat above said weight detecting device;
    wherein said front attached portion of said rail member is fixed to an extension extending rearwardly from the rear end of said load transfer member, and said anchor of the seat belt webbing having a predetermined longitudinal length along the sliding direction and is slidably fitted onto said slide portion of said rail member, curved portion curving upwardly in said rail member having a curvature dimensioned to prevent said anchor from sliding onto said curved portion and to prevent said anchor from sliding onto said curved portion upwardly curving.

* * * * *